United States Patent
Zhu et al.

(10) Patent No.: US 9,917,749 B2
(45) Date of Patent: Mar. 13, 2018

(54) CLOUD-BASED WIRELESS NETWORK ANALYSIS

(71) Applicant: Verizon Patent and Licensing Inc., Arlington, VA (US)

(72) Inventors: Lily Zhu, Parsippany, NJ (US); Christopher M. Schmidt, Branchburg, NJ (US); Sunny Rodrigues, Iselin, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 161 days.

(21) Appl. No.: 14/721,602

(22) Filed: May 26, 2015

(65) Prior Publication Data
US 2016/0352589 A1    Dec. 1, 2016

(51) Int. Cl.
| | | |
|---|---|---|
| G06F 15/00 | (2006.01) |
| G06F 11/16 | (2006.01) |
| H04L 12/26 | (2006.01) |
| H04W 24/10 | (2009.01) |

(52) U.S. Cl.
CPC ............ *H04L 43/04* (2013.01); *H04W 24/10* (2013.01)

(58) Field of Classification Search
USPC ................. 709/224, 213, 204, 226
See application file for complete search history.

(56) References Cited

U.S. PATENT DOCUMENTS

| | | | | |
|---|---|---|---|---|
| 7,058,408 B2* | 6/2006 | Morgan | ............. | H04W 76/048 455/446 |
| 8,009,595 B2* | 8/2011 | Lindoff | ................. | H04W 52/40 370/310 |
| 2004/0127235 A1* | 7/2004 | Kotzin | .................... | H04L 12/14 455/466 |
| 2004/0205397 A1* | 10/2004 | Rajiv | ..................... | G05B 17/02 714/25 |
| 2009/0233611 A1* | 9/2009 | Olsson | .................. | H04W 24/00 455/446 |
| 2010/0015984 A1* | 1/2010 | Kazmi | ............. | H04W 36/0088 455/437 |
| 2010/0015985 A1* | 1/2010 | Chang | ............... | H04W 36/0083 455/442 |

(Continued)

OTHER PUBLICATIONS

Tutorialspoint, "LTE Protocol Stack Layers," http://www.tutorialspoint.com/lte/lte_protocol_stack_layers.htm, Jan. 13, 2013, 4 pages.

*Primary Examiner* — Jude Jean Gilles

(57) ABSTRACT

A device may determine log information, collected by a user device, that may include information associated with communications between the user device and a base station. The user device and the base station may be associated with a wireless network. The device may analyze the log information to determine event information associated with the user device. The event information may include information associated with an event experienced by the user device during the communications between the user device and the base station. The device may generate action information based on the event information. The action information may include information associated with organizing, categorizing, classifying, or diagnosing the event experienced by the user device. The device may provide the action information.

20 Claims, 10 Drawing Sheets

(56) References Cited

U.S. PATENT DOCUMENTS

| | | | | |
|---|---|---|---|---|
| 2010/0113035 A1* | 5/2010 | Eskicioglu | ........ | H04W 36/0083 455/444 |
| 2010/0312522 A1* | 12/2010 | Laberge | ............. | G05B 23/0227 702/184 |
| 2011/0183704 A1* | 7/2011 | Moreno | ............ | H04W 52/0229 455/522 |
| 2012/0254309 A1* | 10/2012 | Tokashiki | ............ | G06F 11/3476 709/204 |
| 2014/0248885 A1* | 9/2014 | Van Lieshout | ... | H04W 36/0094 455/437 |
| 2016/0147622 A1* | 5/2016 | Nichols | ............. | G06F 17/30144 714/57 |
| 2016/0188897 A1* | 6/2016 | Zatko | .................. | G06F 21/6218 726/28 |
| 2016/0188909 A1* | 6/2016 | Zatko | ...................... | G06F 21/71 726/26 |

\* cited by examiner

US 9,917,749 B2

CLOUD-BASED WIRELESS NETWORK ANALYSIS

BACKGROUND

A user device (e.g., a mobile phone, a smart phone, etc.) may be capable of wirelessly communicating via a base station (e.g., an evolved NodeB (eNB)) associated with a radio access network (RAN) (e.g., a Long Term Evolution (LTE) network). The user device may be capable of collecting and storing log information, associated with communicating via the base station, using one or more protocol layers (e.g., a physical layer, a media access control (MAC) layer, a signaling layer, etc.).

DETAILED DESCRIPTION OF PREFERRED EMBODIMENTS

Figure 1A:
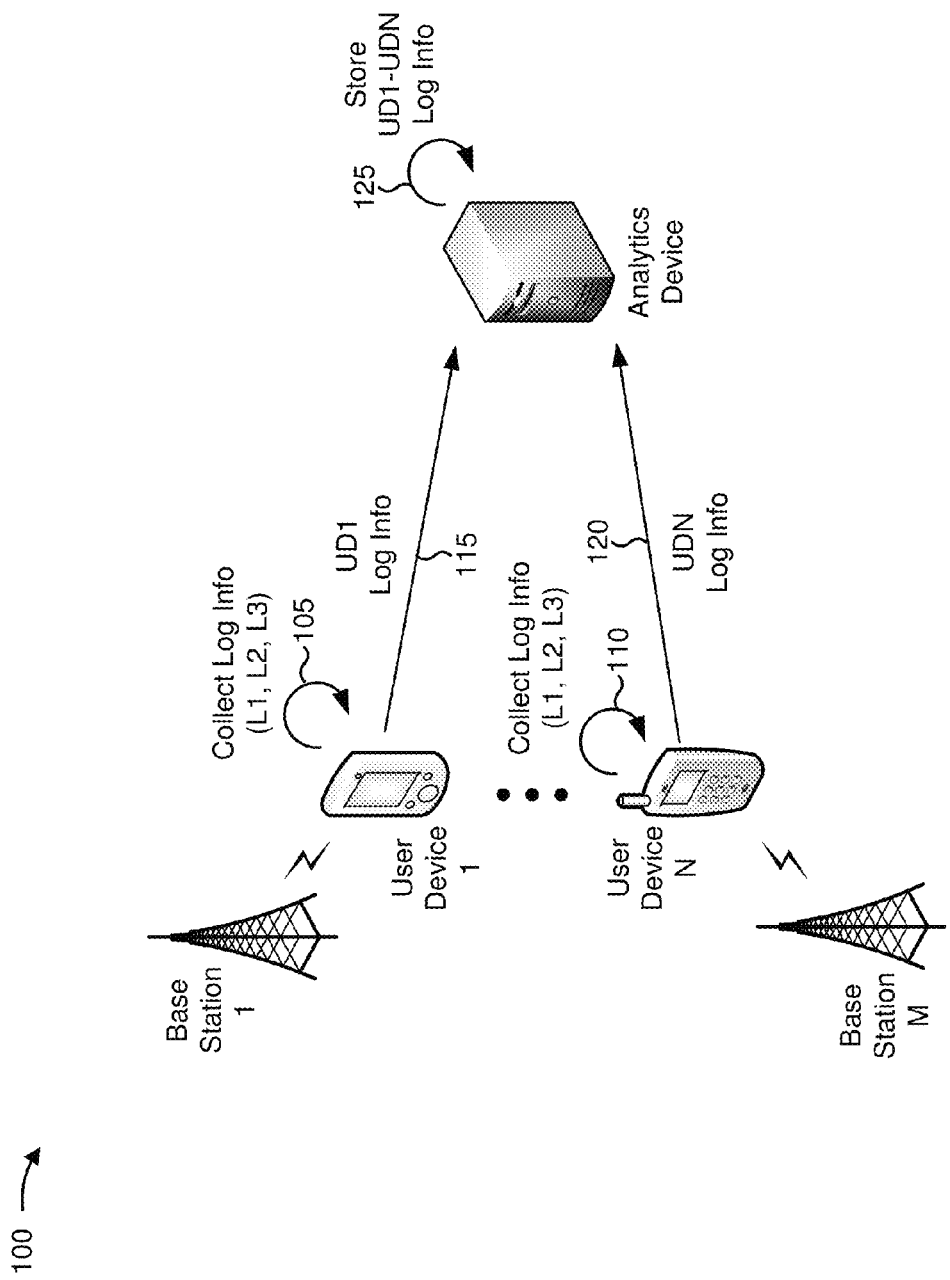
FIGS. 1A and 1B are diagrams of an overview of an example implementation described herein.

The following detailed description of example implementations refers to the accompanying drawings. The same reference numbers in different drawings may identify the same or similar elements.

A user device (e.g., a mobile phone, a smart phone, etc.) may be capable of wirelessly communicating via a base station (e.g., an evolved NodeB (eNB)) associated with a wireless network, such as a radio access network (RAN) (e.g., a Long Term Evolution (LTE) network). In some cases, an event (e.g., an error event, a failure event, a conformance event, etc.) may occur during communications between the user device and the base station. However, determining event information (e.g., determining that the event has occurred, determining a cause of the event, correlating performance metrics, etc.), associated with event, after it happened may be challenging since the event may occur under a specific set of circumstances (e.g., a set of circumstances that may be difficult and/or time consuming to re-create in a testing environment).

In some cases, a base station of the wireless network may be capable of collecting log information, associated with the wireless network, for network analysis purposes associated with determining event information associated with an event. However, the log information, collected by the base station, may be of limited use in analyzing the wireless network. For example, the base station may only be capable of receiving, storing, and/or detecting a limited amount of log information (e.g., due to a limited storage capacity, a high volume of available information, etc.). As another example, the base station may only be capable of collecting log information seen by the base station, such as information associated with a radio link (e.g., downlink), one or more high layers of a wireless network architecture (e.g., a S1 Application Protocol (S1AP) layer, a portion of information associated with a radio resource control (RRC) layer, etc.), when log information associated with one or more low layers of the wireless network architecture (e.g., a radio link control (RLC) layer, a media access control (MAC) layer, a packet data convergence protocol (PDCP) layer, a physical (PHY) layer, etc.) and/or one or more high layers (e.g., additional information associated with the RRC layer, etc.), available to a user device, may also be useful for wireless network analysis. As such, event information, associated with an event that occurs in the wireless network, may be difficult to determine based only on the log information collected by the base station.

Similarly, the log information, collected by the base station, may be of limited use since the log information may include only information that is available to the base station (e.g., rather than log information that may be collected by a user device communicating via the base station). In other words, the log information may only reflect the network side of the "story" associated with an event, rather than the user device side. Under such circumstances, it may be difficult to recreate and/or duplicate circumstances surrounding an event, and additional testing, root cause analysis, or the like, associated with the event, may be difficult and/or time consuming.

Implementations described herein may provide for wireless network analysis based on log information associated with user devices communicating via the wireless network. As such, the wireless network analysis may allow an event, associated with an event the user devices, to be automatically detected, identified, analyzed, verified categorized, classified, diagnosed, or the like, such that an operator of the wireless network may act accordingly.

Figure 1B:
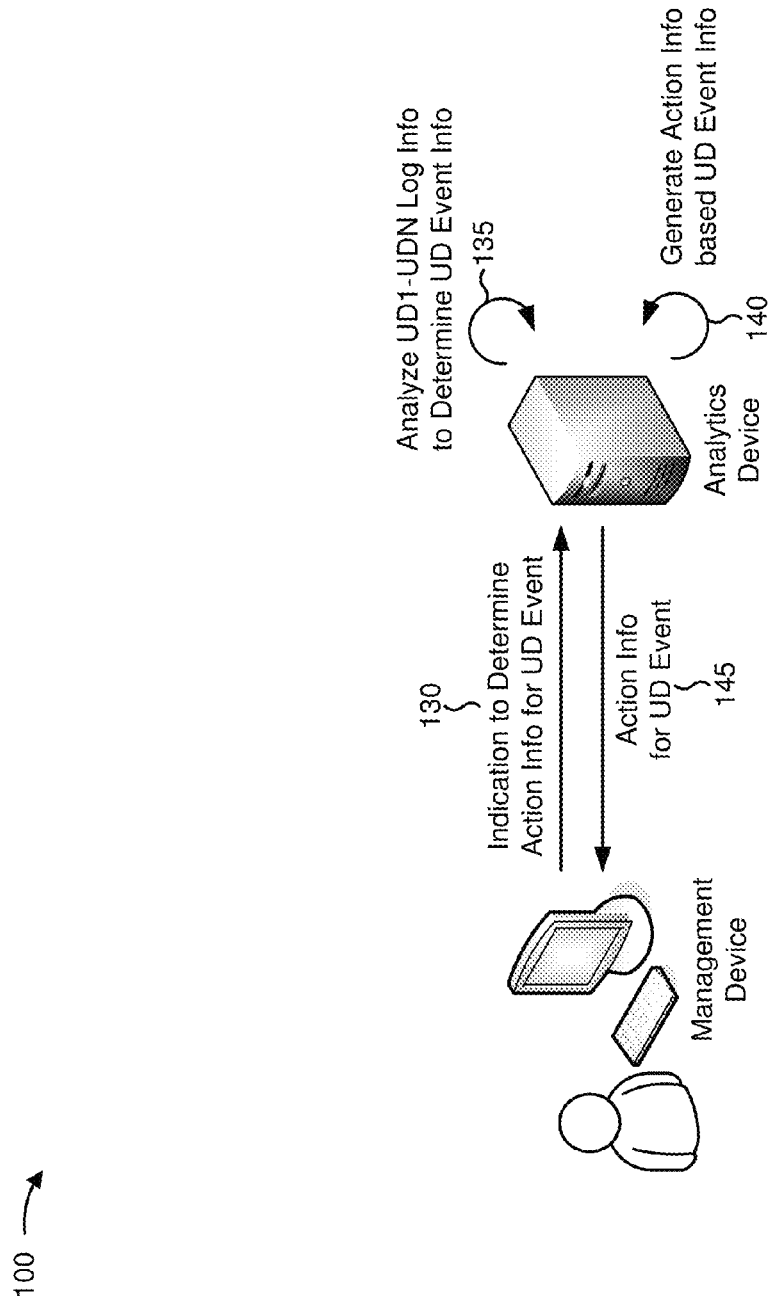

FIGS. 1A and 1B are diagrams of an overview of an example implementation 100 described herein. For the purpose of example implementation 100, assume that a group of user devices (e.g., user device 1 through user device N) are communicating via a corresponding group of base stations (e.g., base station 1 through base station M) associated with a wireless network (e.g., an LTE network). Further, assume that each user device is configured to collect log information associated with communicating via a base station via which the user device is communicating.

As shown in FIG. 1A, and by reference number 105, user device 1 may collect log information associated with communicating via base station 1. As shown, the log information may include information associated with one or more layers of a wireless network architecture, such as layer 1 information (e.g., PHY layer information), layer 2 information (e.g., RLC layer information, MAC layer, PDCP layer information), and/or layer 3 information (e.g., RRC layer information, etc.) associated with wireless communications between user device 1 and base station 1. Similarly, as shown by reference number 110, user device N may collect log information associated with communicating via base station M. As shown by reference numbers 115 and 120, user device 1 and user device N may provide (e.g., automatically, based on a request, etc.) the user device 1 log information and the user device N log information, respectively, to an analytics device associated with analyzing user device log information. As shown by reference number 125, the analytics device may store the log information. In some implementations, the analytics device may also receive, from the base station, log information collected by the base station (e.g., such that the analytics device may analyze the log information in addition to the log information).

As shown in FIG. 1B, and by reference number 130, a management device, associated with managing the LTE network, may provide (e.g., based on user input) an indication to generate action information associated with an event that may be experienced by user device 1 through user device N. In some implementations, the action information may include information associated with organizing, correlating, categorizing, classifying, diagnosing, or the like, occurrences of an event experienced by user device 1 through user device N such that the network operator may act accordingly (e.g., to improve a performance of the wireless network, to enhance the performance of the wireless network, to plan for expansion of the wireless network, etc.).

As shown by reference number 135, after receiving the indication, the analytics device may analyze the log information, associated with user device 1 through user device N and stored by the analytics device, to determine event information associated with the log information. In some implementations, the event information may include information associated with the event (e.g., an error event, a failure event, a conformance event, etc.) experienced by at least one of user device 1 through user device N, such as information indicating that the event has occurred, information identifying a cause of the event, correlated performance metrics associated with the event, or the like. In some implementations, the analytics device may analyze the log information to determine the event information based on an indication, as described above. Additionally, or alternatively, the analytics device may automatically (e.g., without user intervention) analyze the log information associated with user device 1 through user device N.

As shown by reference number 140, the analytics device may determine, based on the event information, the action information associated with the event. As shown by reference number 145, the analytics device may provide, to the management device, the action information to the management device (e.g., such that the user may view the action information).

In this way, wireless network analysis may be based on log information associated with user devices communicating via the wireless network. As such, the wireless network analysis may allow an event, associated with the user devices, to be automatically detected, identified, analyzed, categorized, classified, diagnosed, or the like, such that an operator of the wireless network may act accordingly.

Figure 2:
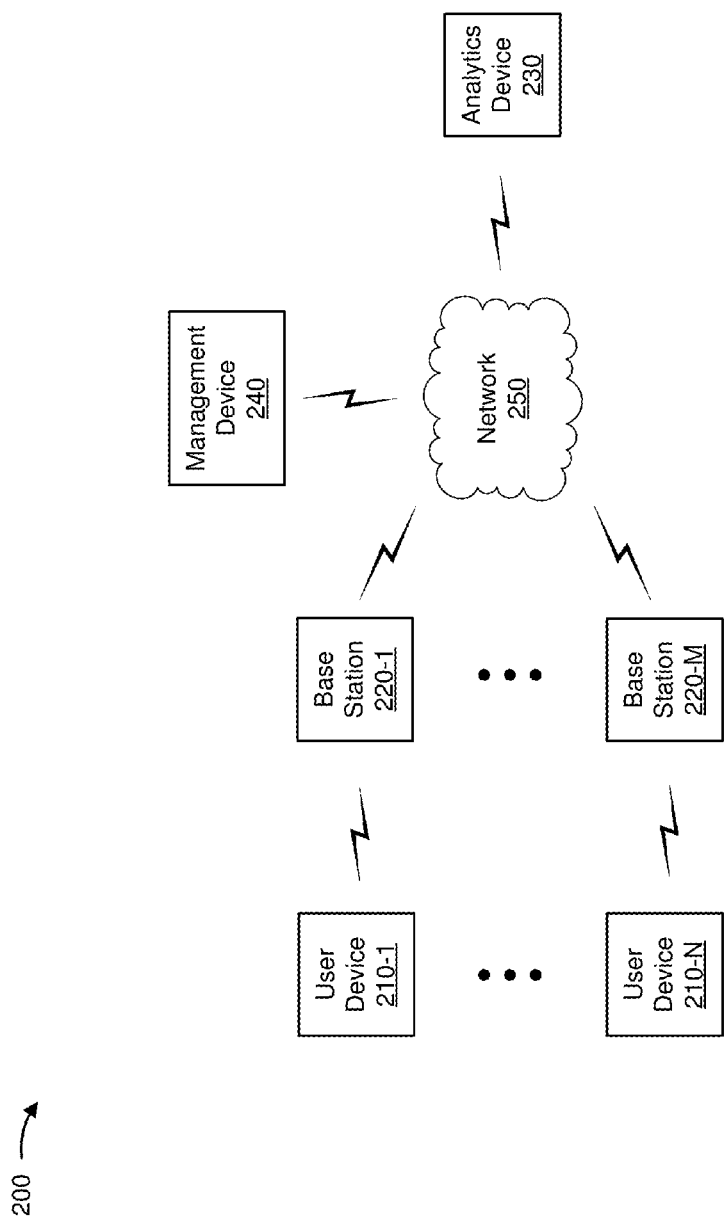
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more user devices 210-1 through 210-N (N≥1) (hereinafter referred to collectively as user devices 210, and individually as user device 210), one or more base stations 220-1 through 220-M (M≥1) (hereinafter referred to collectively as base stations 220, and individually as base station 220), an analytics device 230, a management device 240, and a network 250. Devices of environment 200 may interconnect via wired connections, wireless connections, or a combination of wired and wireless connections.

User device 210 may include one or more devices capable of receiving, generating, storing, processing, and/or providing log information associated with user device 210. For example, user device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 210 may be capable of collecting log information associated with communications between user device 210 and base station 220. In some implementations, user device 210 may receive information from and/or transmit information to another device in environment 200.

Base station 220 may include one or more devices capable of communicating with user device 210 using a cellular radio access technology. For example, base station 220 may include a base transceiver station, a radio base station, a node B, an evolved node B (eNB), a base station subsystem, a cellular site, a cellular tower (e.g., a cell phone tower, a mobile phone tower, etc.), a radio access node, a macrocell base station, a microcell base station, a picocell base station, a femtocell base station, or a similar type of device. Base station 220 may transfer traffic between user device 210, analytics device 230, management device 240, and/or network 250. In some implementations, base station 220 may communicate with user device 210 using radio waves.

Analytics device 230 may include a device capable of receiving, storing, generating processing, and/or analyzing log information, associated with user devices 210 (e.g., in order to determine event information associated with user devices 210, in order to generate action information associated with the event information, etc.). For example, analytics device 230 may include a server device or a collection of server devices. In some implementations, analytics device 230 may be included in a cloud computing network. Additionally, or alternatively, analytics device 230 may include a communication interface that allows analytics device 230 to receive information from and/or transmit information to other devices in environment 200.

Management device 240 may include a device capable of requesting, receiving, storing, processing, and/or providing action information associated with user device 210. For example, management device 240 may include a server device or a collection of server devices. In some implementations, management device 240 may include a communication interface that allows management device 240 to receive information from and/or transmit information to other devices in environment 200.

Network 250 may include one or more wired and/or wireless networks. For example, network 250 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
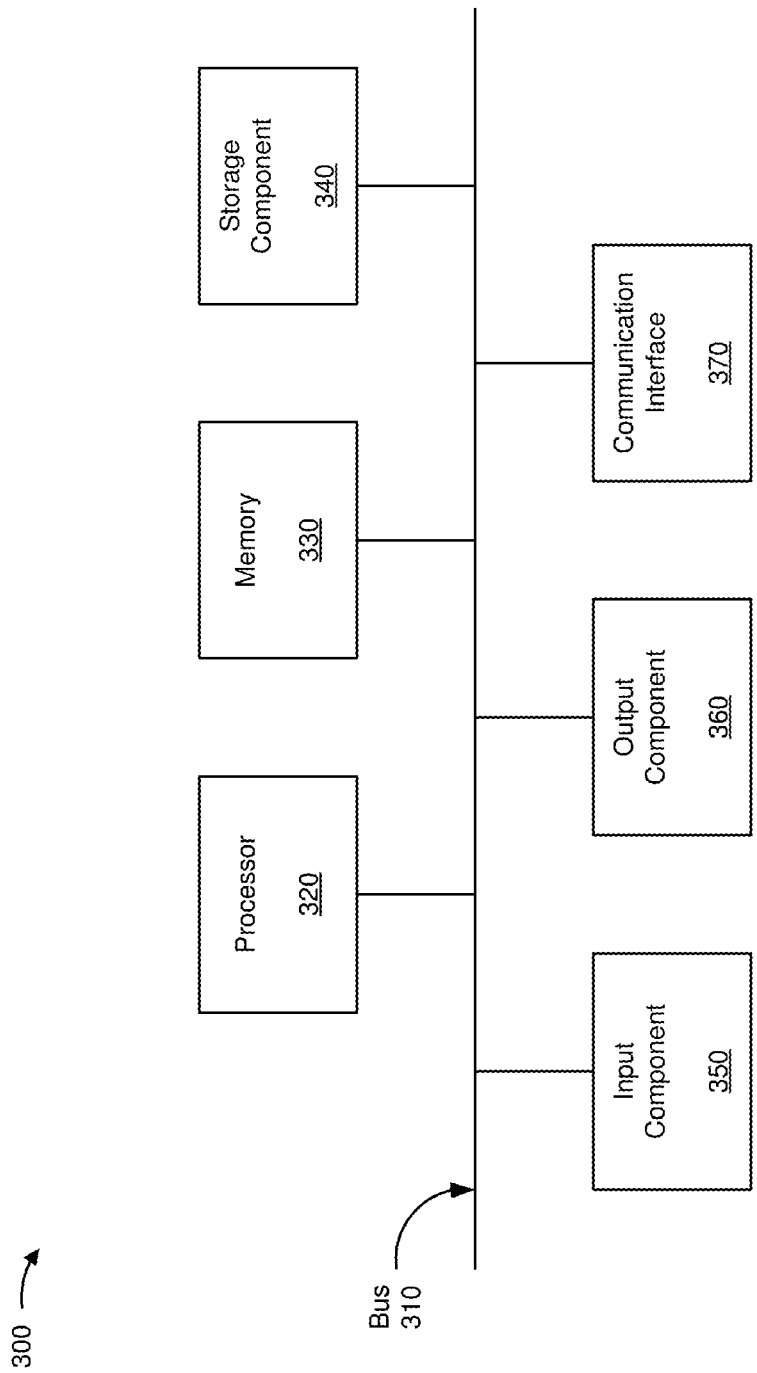
FIG. 3 is a diagram of example components of one or more devices of FIG. 2.

FIG. 3 is a diagram of example components of a device 300. Device 300 may correspond to user device 210, base station 220, analytics device 230, and/or management device 240. In some implementations, user device 210, base station 220, analytics device 230, and/or management device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
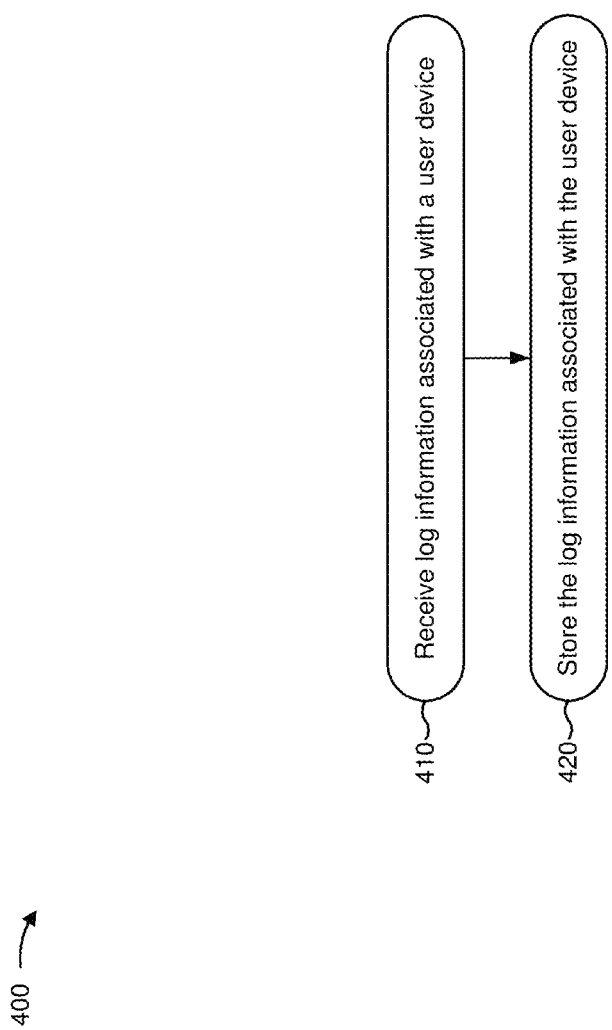
FIG. 4 is a flow chart of an example process for receiving and storing log information associated with a user device.

FIG. 4 is a flow chart of an example process 400 for receiving and storing log information associated with a user device. In some implementations, one or more process blocks of FIG. 4 may be performed by analytics device 230. In some implementations, one or more process blocks of FIG. 4 may be performed by another device or a set of devices separate from or including analytics device 230, such as base station 220.

As shown in FIG. 4, process 400 may include receiving log information associated with a user device (block 410). For example, analytics device 230 may receive log information associated with user device 210. In some implementations, analytics device 230 may receive the log information when user device 210 provides the log information. Additionally, or alternatively, analytics device 230 may receive the log information after analytics device 230 requests the log information (e.g., from user device 210).

The log information may include information associated with wireless communications between user device 210 and base station 220. For example, the log information may include information associated with one or more protocol layers of a wireless network architecture designed to permit communications between user device 210 and base station 220, such as layer 1 information (e.g., PHY layer information), layer 2 information (e.g., RLC layer information, MAC layer, PDCP layer information), layer 3 information (e.g., RRC layer information, etc.), or the like. In some implementations, user device 210 may collect the log information when user device 210 communicates via base station 220. For example, user device 210 may collect the log information when user device 210 sends and/or receives information from and/or to base station 220 via a wireless connection.

Additionally, or alternatively, the log information may include another type of information associated with performing network analysis, such as information that identifies user device 210 (e.g., a device identifier, a device name, a device type, etc.), information that identifies one or more base stations 220 associated with the log information (e.g., information that identifies base stations 220 via which user device 210 communicates), location information associated with the log information (e.g., a set of global positioning system (GPS) coordinates that identifies a location of user device 210 when the log information is collected), time information associated with the log information (e.g., a time at which user device 210 collected the log information, a date on which user device 210 collected the log information, a date associated with the log information, etc.), or the like.

In some implementations, the log information may include information that may not be available to and/or collected by base station 220. For example, as described above, base station 220 may not collect layer 1 information and/or layer 2 information associated with user device 210 communicating via base station 220. However, the log information, collected by user device 210, may include the layer 1 information and/or the layer 2 information associated with user device 210.

In some implementations, analytics device 230 may receive the log information from user device 210. For example, user device 210 may collect the log information, and may provide the log information to analytics device 230. In some implementations, analytics device 230 may receive the log information based on a configuration of user device 210. For example, user device 210 may collect the log information, and may provide the log information to analytics device 230 at a particular time (e.g., every day at 12:00 a.m., every Sunday at 3:00 a.m., every 12 hours, etc.), at a random time (e.g., at a random time once per day, at a random time once per week, etc.), when user device 210 connects to a particular network (e.g., a WiFi network associated with a home of a user of user device 210) and/or a particular type of network (e.g., when user device 210 connects to a WiFi network).

Additionally, or alternatively, analytics device 230 may receive the log information based on an occurrence of an event. For example, user device 210 may be configured to provide log information, associated with communicating via base station 220, when user device 210 experiences a voice-over LTE (VoLTE) call drop, experiences a connection error, or the like. In this example, user device 210 may provide log information associated with the occurrence of the event (e.g., user device 210 may provide log information collected during a 30 second period of time before the VoLTE call drop, a one minute period of time before the connection error, etc.).

In some implementations, the user of user device 210 may configure the time at and/or manner in which user device 210 provides the log information to analytics device 230. Additionally, or alternatively, a network operator, associated with base stations 220, may configure the time and/or manner in which user device 210 provides the log information to analytics device 230.

In some implementations, analytics device 230 may receive log information collected by multiple user devices 210 (e.g., hundreds of user devices 210, thousands of user devices 210, etc.) communicating via corresponding multiple base stations 220. As such, analytics device 230 may act as a (e.g., cloud-based) storage device for log information that may be used to perform network analysis associated with multiple user devices 210.

In some implementations, analytics device 230 may also receive log information collected by base station 220. For example, analytics device 230 may receive, from base station 220, log information that includes information associated with one or more high protocol layers of the wireless network architecture, such as SLAP layer information, additional layer 3 information (e.g., RRC layer information, etc.), or the like. In some implementations, base station 220 may collect the log information when user device 210 communicates via base station 220. For example, base station 220 may collect the log information when user device 210 sends and/or receives information from and/or to base station 220 via a wireless connection.

In some implementations, analytics device 230 may receive the log information from base station 220. For example, base station 220 may collect the log information, and may provide the log information to analytics device 230. In some implementations, analytics device 230 may receive the log information based on a configuration of base station 220. For example, base station 220 may collect the log information, and may provide the log information to analytics device 230 at a particular time, at a random time, based on a request, or the like. Additionally, or alternatively, analytics device 230 may receive the log information from base station 220 based on an occurrence of an event.

As further shown in FIG. 4, process 400 may include storing the log information associated with the user device (block 420). For example, analytics device 230 may store the log information associated with user device 210. In some implementations, analytics device 230 may store the log information after analytics device 230 receives the log information. Additionally, or alternatively, analytics device 230 may store the log information based on information, indicating that analytics device 230 is to store the log information, received from another device, such as user device 210 and/or management device 240.

In some implementations, analytics device 230 may store the log information in a memory location (e.g., a RAM, a ROM, a cache, a hard disk, etc.) of analytics device 230. Additionally, or alternatively, analytics device 230 may provide the log information to another device for storage.

In some implementations, analytics device 230 may store information associated with the log information such that previous log information (e.g., log information provided by user device 210 at an earlier time) is supplemented, modified, overwritten, deleted, or the like. Additionally, or alternatively, analytics device 230 may store the log information such that analytics device 230 may retrieve the log information at a later time.

In some implementations, analytics device 230 may store log information collected by base station 220. For example, analytics device 230 may store the log information after analytics device 230 receives the log information from base station 220.

In some implementations, analytics device 230 may store the log information with respect to user device 210 (e.g., such that the log information may be retrieved based on information that identifies user device 210, a device type of user device 210, etc.), with respect to base station 220 (e.g., such that the log information may be retrieved based on information that identifies base station 220), with respect to location information associated with user device 210 (e.g., such that the log information may be retrieved based on the location information), with respect to time information associated with user device 210 (e.g., such that the log information may be retrieved based on the time information), or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
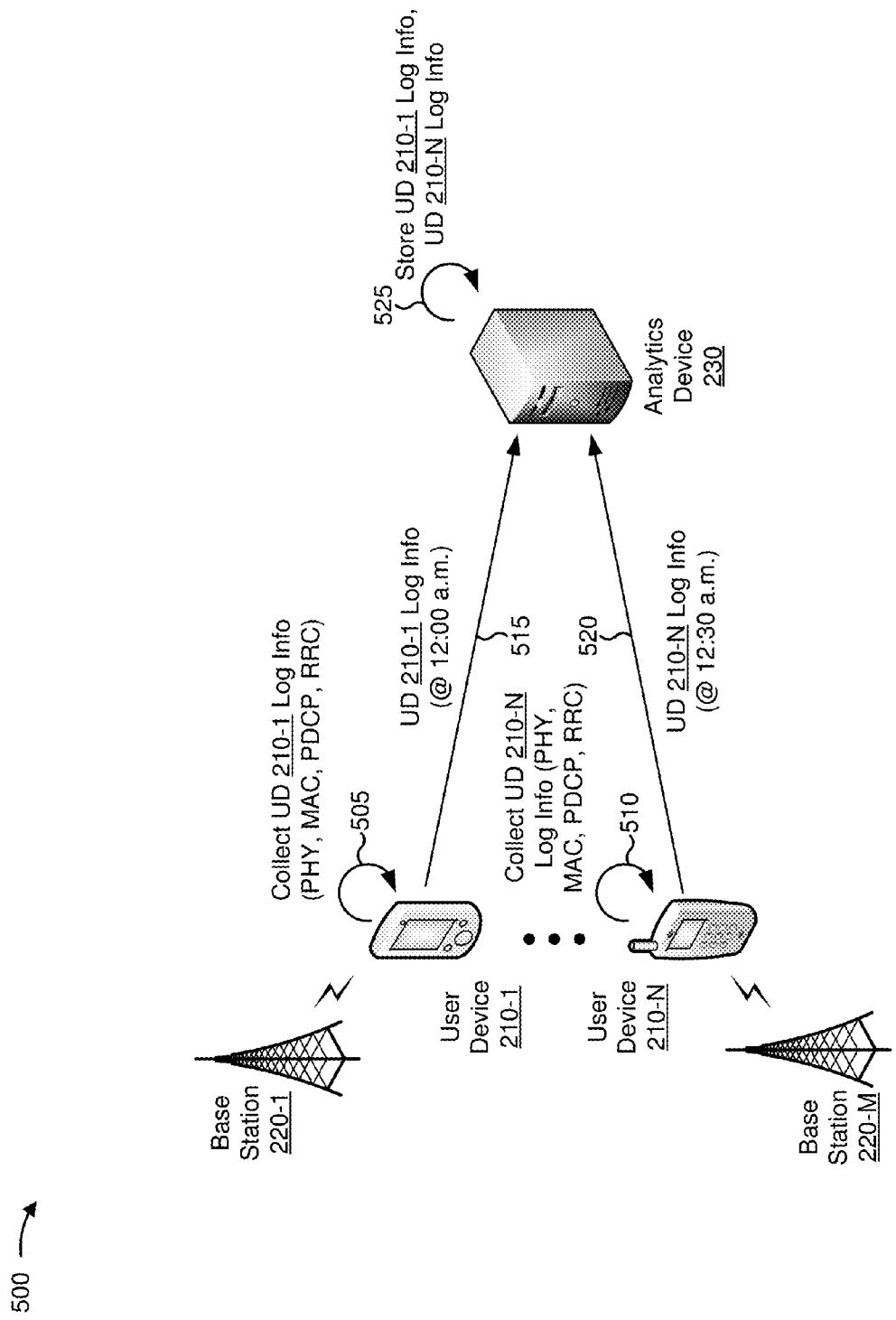
FIG. 5 is a diagram of an example implementation relating to the example process shown in FIG. 4.

FIG. 5 is a diagram of an example implementation 500 relating to example process 400 shown in FIG. 4. For the purposes of example implementation 500, assume that user device 210-1 communicates via base station 220-1 associated with a wireless network, and that user device 210-N communicates via base station 220-M associated with the wireless network.

As shown in FIG. 5, and by reference number 505, user device 210-1 may collect log information associated with communications between user device 210-1 and base station 220-1. As shown, the log information may include PHY layer information, RLC layer information, MAC layer information, PDCP layer information, and RRC layer information, associated with communications between user device 210-1 and base station 220-1. In some implementations, the log information may include information associated with user device 210-1, base station 220-1, location information associated with the user device 210-1 log information, time information associated with the user device 210-1 log information, or the like. Similarly, as shown by reference number 510, user device 210-N may collect log information associated with communications between user device 210-N and base station 220-M.

As shown by reference number 515, user device 210-1 may (e.g., automatically) provide the user device 210-1 log information to analytics device 230. For example, as shown, user device 210-1 may be configured to provide collected user device 210-1 log information every day at 12:00 a.m., and user device 210-1 may provide the user device 210-1 log information accordingly. Similarly, as shown by reference number 520, user device 210-N may (e.g., automatically) provide the user device 210-N log information to analytics device 230. For example, as shown, user device 210-N may be configured to provide collected user device 210-N log information every day at 12:30 a.m., and user device 210-N may provide the user device 210-N log information accordingly. As shown by reference number 525, analytics device 230 may receive the user device 210-1 log information and the user device 210-N log information, and may store the user device 210-1 log information and the user device 210-N log information.

Even though not shown in FIG. 5, base stations 220-1 and 220-M may also be configured to send log information to analytics device 230. Analytics device 230 may receive the log information from base stations 220-1 and 220-M, and may store the log information accordingly.

As indicated above, FIG. 5 is provided merely as an example. Other examples are possible and may differ from what was described with regard to FIG. 5.

Figure 6:
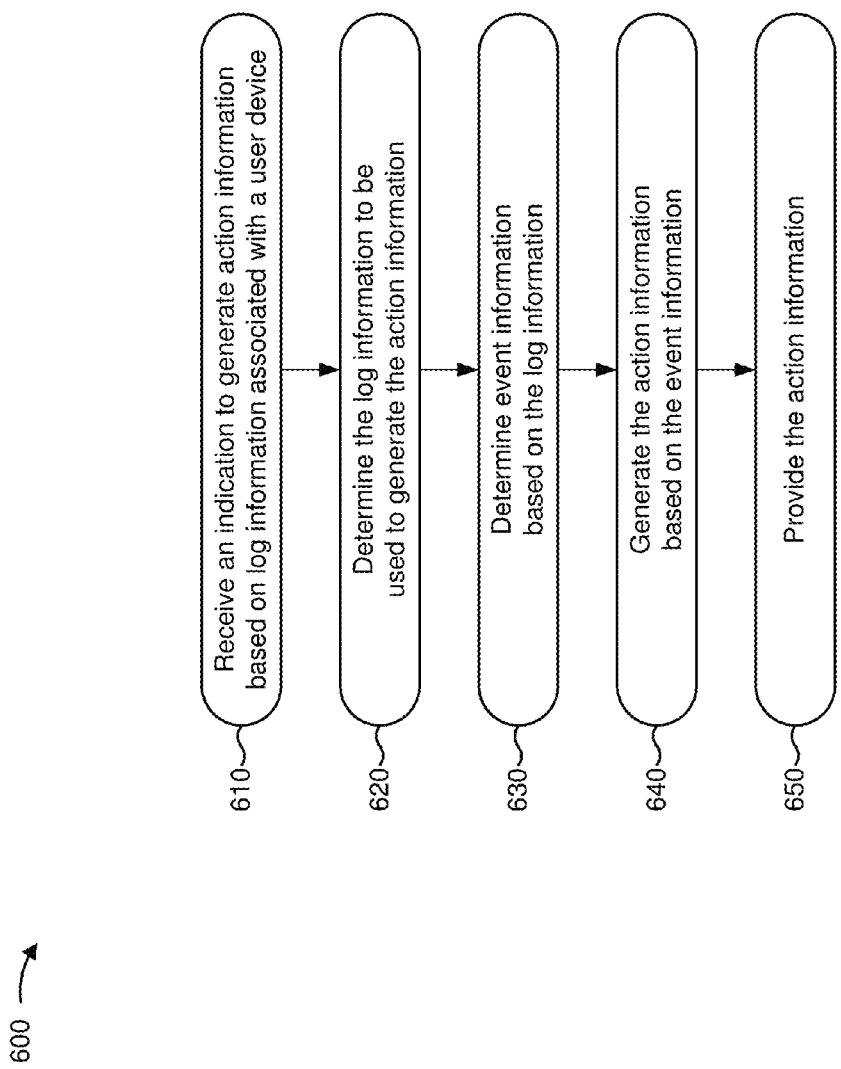
FIG. 6 is a flow chart of an example process for generating action information based on log information associated with a user device.

FIG. 6 is a flow chart of an example process 600 for generating action information based on log information associated with a user device. In some implementations, one or more process blocks of FIG. 6 may be performed by analytics device 230. In some implementations, one or more process blocks of FIG. 6 may be performed by another device or a set of devices separate from or including analytics device 230, such as management device 240.

As shown in FIG. 6, process 600 may include receiving an indication to generate action information based on log information associated with a user device (block 610). For example, analytics device 230 may receive an indication to generate action information based on log information associated with user device 210. In some implementations, analytics device 230 may receive the indication when another device provides the indication, such as management device 240. Additionally, or alternatively, analytics device 230 may receive the indication based on a configuration of analytics device 230.

The action information may include information associated with organizing, correlating, categorizing, classifying, diagnosing, or the like, occurrences of an event, experienced by user device 210, such that the network operator may act to improve a performance of the wireless network, to enhance the performance of the wireless network, to plan for expansion of the wireless network, to certify a user device, or the like. In some implementations, analytics device 230 may generate the action information based on event information, as described below.

In some implementations, the indication may include information that identifies an event associated with the action information. For example, the indication may include information indicating that action information associated with causes of VoLTE call drops is to be generated. As another example, the indication may include information indicating that action information associated with errors caused by a known software bug is to be generated.

Additionally, or alternatively, the indication may identify log information associated with generating the action information. For example, the indication may identify a device type of user device 210 for which log information is to be analyzed to generate the action information (e.g., such that the action information may be generated only for user devices 210 of the device type). As another example, the indication may identify base station 220 for which log information is to be analyzed to generate the action information (e.g., such that the action information may be generated for a particular base station 220). As yet another example, the indication may identify a geographic area for which the log information is to be analyzed to generate the action information (e.g., such that action information for the geographic area may be generated). As a final example, the indication may identify a time period for which the log information is to be analyzed to generate the action information (e.g., such that action information for a period of seconds, minutes, hours, days, etc., may be generated).

Additionally, or alternatively, the indication may be associated with determining action information associated with the wireless network. For example, the indication may indicate that analytics device 230 is to generate action information, associated with a particular event, that indicates a manner in which the network operator may improve a performance of the wireless network, enhance the performance of the wireless network, expand the wireless network, or the like.

In some implementations, analytics device 230 may receive the indication based on user input. For example, a user of management device 240 may provide input indicating that analytics device 230 is to generate the action information. Additionally, or alternatively, analytics device 230 may receive the indication based on a configuration of analytics device 230. For example, analytics device 230 may be configured to automatically (e.g., without user intervention) generate the action information (e.g., at particular intervals of time, each time analytics device 230 receives log information, etc.).

As further shown in FIG. 6, process 600 may include determining the log information to be used to generate the action information (block 620). For example, analytics device 230 may determine the log information to be used to generate the action information. In some implementations, analytics device 230 may determine the log information after analytics device 230 receives the indication to generate the action information. Additionally, or alternatively, analytics device 230 may determine the log information after analytics device 230 receives the log information from one or more user devices 210 and/or one or more base stations 220.

In some implementations, analytics device 230 may determine the log information based on log information stored or accessible by analytics device 230. For example, analytics device 230 may receive and store log information associated with multiple user devices 210, as described above, and may determine the log information based on the stored log information. Additionally, or alternatively, analytics device 230 may determine the log information based on requesting the log information. For example, analytics device 230 may receive the indication to generate the action information, and may request the log information from one or more user devices 210 (e.g., when the one or more user devices 210 have not provided the log information to analytics device 230) and/or one or more base stations 220 (e.g., when the one or more base stations 220 have not provided the log information to analytics device 230).

In some implementations, analytics device 230 may determine the log information based on information included in the indication. For example, analytics device 230 may determine log information for a user device 210 identified in the indication, user devices 210 of a device type identified in the indication, for a base station 220 identified in the indication, for a geographic area identified in the indication, for a time period identified in the indication, or the like.

As further shown in FIG. 6, process 600 may include determining event information based on the log information (block 630). For example, analytics device 230 may determine event information based on the log information. In some implementations, analytics device 230 may determine the event information after analytics device 230 determines the log information to be used to determine the action information. Additionally, or alternatively, analytics device 230 may determine the event information after analytics device 230 receives the indication to determine the event information.

The event information may include information associated with an event experienced by user device 210 during communications between user device 210 and base station 220. For example, the event information may include information associated with determining that the event has occurred, determining a cause of the event, correlating performance metrics associated with the event, or the like. In some implementations, the event may include an error event (e.g., a decoding error event, a connection error event, etc.), a failure event (e.g., a VoLTE call drop, an access failure, etc.), a conformance event (e.g., a device certification event, a successful VoLTE call, etc.), or another type of event that may occur during communications between user device 210 and base station 220.

In some implementations, analytics device 230 may analyze the log information to determine event information associated with detecting and/or identifying occurrences of the event. For example, analytics device 230 may store and/or have access to information that identifies a log information pattern, such as a sequence of information that, when included in the log information, indicates that user device 210 has experienced the event (e.g., a sequence of log information that identifies a known software bug, a sequence of log information that identifies a known failure, a sequence of information that identifies a conformance activity associated with user device certification, etc.). Here, analytics device 230 may analyze the log information and determine whether the log information includes the sequence of information. In this case, if the log information includes the sequence of information, then analytics device 230 may determine that the event has occurred (e.g., that user device 210 has known the software bug, that user device 210 has experienced the known failure, that user device 210 has successfully performed the conformance activity, etc.). In this way, analytics device 230 may determine event information that identifies and/or detects occurrences of the event associated with user devices 210.

Additionally, or alternatively, analytics device 230 may analyze the log information to determine event information that identifies a cause associated with the event. For example, analytics device 230 may identify and/or detect that user device 210 has experienced an event, and may perform, based on the log information, a root cause analysis, associated with the event, to determine event information that identifies a cause of the event. As a particular example, assume that analytics device 230 determines that user device 210 has experienced an access failure associated with base station 220. Here, analytics device 230 may analyze the log information in order to determine one or more sequences of log information that identify a cause of the access failure. In other words, analytics device 230 may determine event information that identifies a cause of an event (e.g., rather than just the occurrence of the event).

Additionally, or alternatively, analytics device 230 may analyze the log information to determine event information associated with a correlated set of performance metrics associated with the event. For example, analytics device 230 may determine that user device 210 has experienced the event, and may correlate one or more performance metrics, included in the log information, with the occurrence of the event. As a particular example, assume that analytics device 230 determines that user device 210 has experienced a VoLTE call drop when communicating via base station 220. Here, analytics device 230 may correlate a set of performance metrics, included in the log information, for a period time (e.g., 10 seconds, 30 seconds, one minute, etc.) before the VoLTE call drop, with the occurrence of the VoLTE call drop.

In some implementations, analytics device 230 may analyze the log information using a machine learning technique. For example, analytics device 230 may store or have access to a model that may be trained based log information known to be associated with an event. Here, analytics device 230 may provide the log information as an input to the model and may receive, as an output, information that identifies the likelihood of the event.

In some implementations, analytics device 230 may analyze the log information corresponding to multiple user devices 210 in order to determine event information associated with the multiple user devices 210 (e.g., such that event information may be determined for hundreds of user devices 210, thousands of user device 210, etc.).

The above types of analysis and event information are provided as examples. In other words, analytics device 230 may perform, based on the log information associated with user device 210, another type of analysis to determine the event information and/or another type of event information associated with user device 210.

As further shown in FIG. 6, process 600 may include generating the action information based on the event information (block 640). For example, analytics device 230 may generate the action information based on the event information. In some implementations, analytics device 230 may determine the action information after an analytics device 230 determines the event information. Additionally, or alternatively, analytics device 230 may determine the action information when analytics device 230 receives an indication that analytics device 230 is to determine the action information.

As described above, the action information may include information associated with organizing, correlating, categorizing, classifying, diagnosing, or the like, occurrences of the event such that the network operator may act to improve a performance of the wireless network, to enhance the performance of the wireless network, to plan for expansion of the wireless network, to certify a user device associated with the wireless network, or the like. For example, the action information may include information associated with one or more causes of the event, such as a list of causes of the event, a percentage of a total quantity of occurrences of the event associated with each cause, a most frequent cause of the event, a device type to which the event most commonly occurs, or the like.

Additionally, or alternatively, the action information may be based on other information associated with the event, such as time information and/or location information. For example, the action information may be based on location information, associated with the log information, in order to create a failure map that identifies locations of user devices 210 that experience a failure event. Here, the failure map may be used by the network operator to improve, enhance, and/or expand the wireless network. For example, the failure map may identify a coverage hole (e.g., within a particular geographic area) based on radio-frequency (RF) induced failures experienced by user devices 210, and the network operator may improve, enhance, and/or expand the wireless network based on the failure map.

In some implementations, analytics device 230 may generate the action information based on the event information. For example, analytics device 230 may generate the action information based on analyzing the event information to organize, correlate, categorize, classify, diagnose, or the like, events associated with the event information. In some implementations, analytics device 230 may generate action information based on event information for multiple (e.g., hundreds, thousands, etc.) user devices 210. In other words, analytics device 230 may (e.g., automatically) generate action information that provides wide scale network analysis based on log information collected by user devices 210.

The above types of action information are provided as examples. In other words, analytics device 230 may generate, based on the event information, another type of action information associated with the event information.

As further shown in FIG. 6, process 600 may include providing the action information (block 650). For example, analytics device 230 may provide the action information. In some implementations, analytics device 230 may provide the action information after analytics device 230 generates the action information.

In some implementations, analytics device 230 may provide the action information such that a network operator may view and/or access the action information and/or the event information. For example, analytics device 230 may provide, to management device 240, the action information, and a user of management device 240, may view the action information, accordingly. In some implementations, analytics device 230 may provide the action information based on a request for the action information, such as a request provided by management device 240. Additionally, or alternatively, analytics device 230 may automatically provide the action information and/or the event information. Additionally, or alternatively, analytics device 230 may provide the action information for storage (e.g., such that the action information may be viewed and/or accessed at a later time). Additionally, or alternatively, analytics device 230 may provide the event information (e.g., such that the user may view and/or access the event information).

In this way, analytics device 230 may perform network analysis by analyzing log information, associated with user devices 210 (e.g., in order to generate action information based on the log information). As such, there may be no need to re-create circumstances under which user devices 210 operate when experiencing an event in order to perform the network analysis. Moreover, analytics device 230 may be capable of evaluating a performance of user devices 210 (e.g., per user device type) and/or performing user device based network analysis based on the log information associated with user devices 210.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7A:
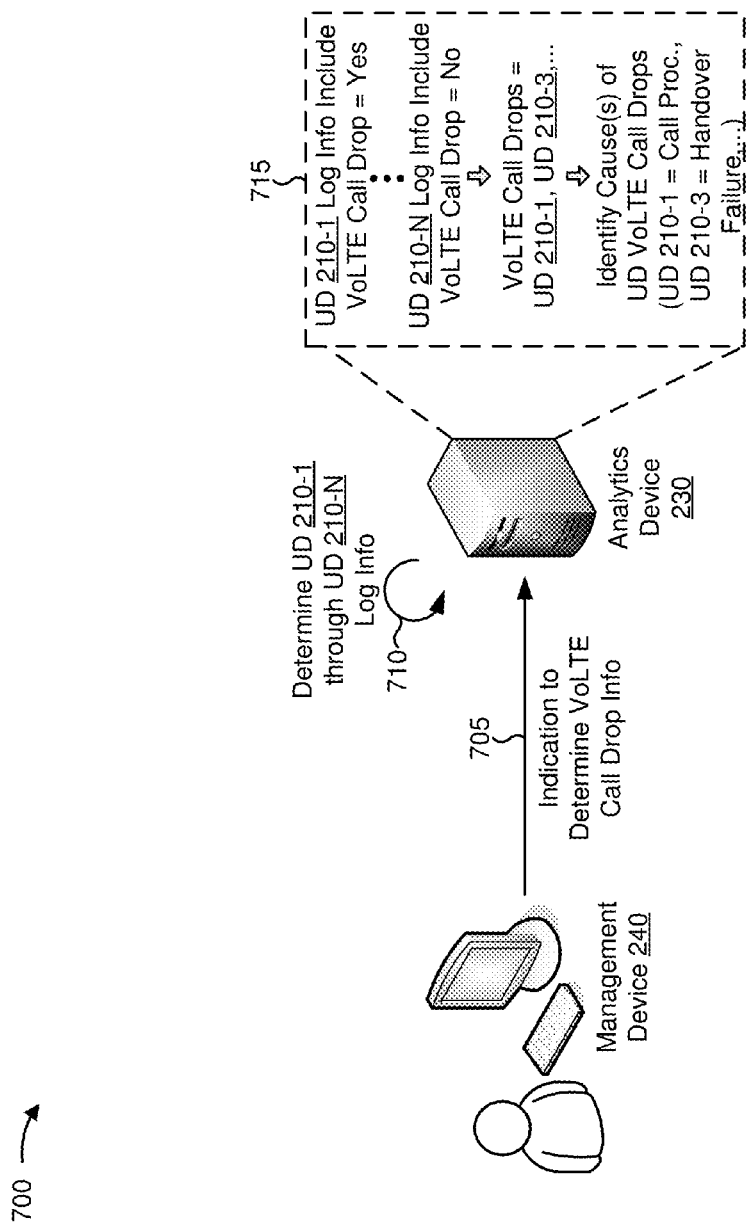
FIGS. 7A-7C are diagrams of an example implementation relating to the example process shown in FIG. 6.
Figure 7B:
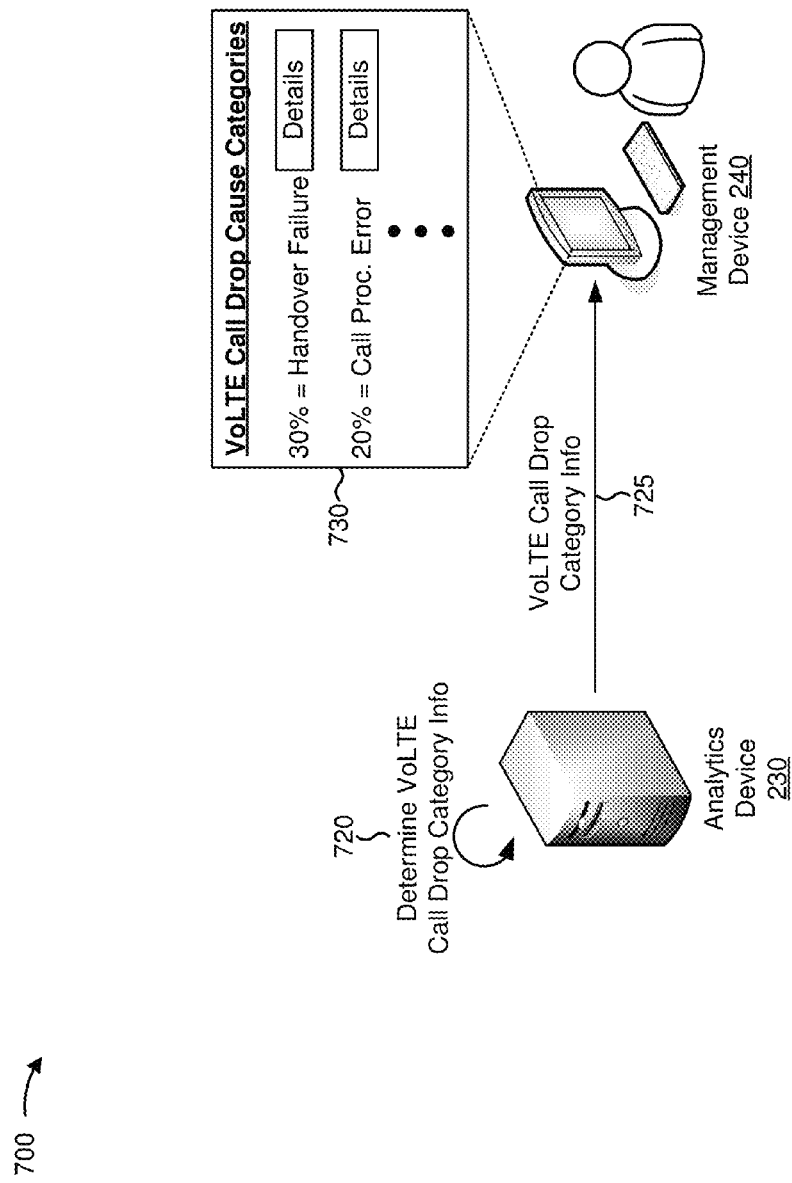
Figure 7C:
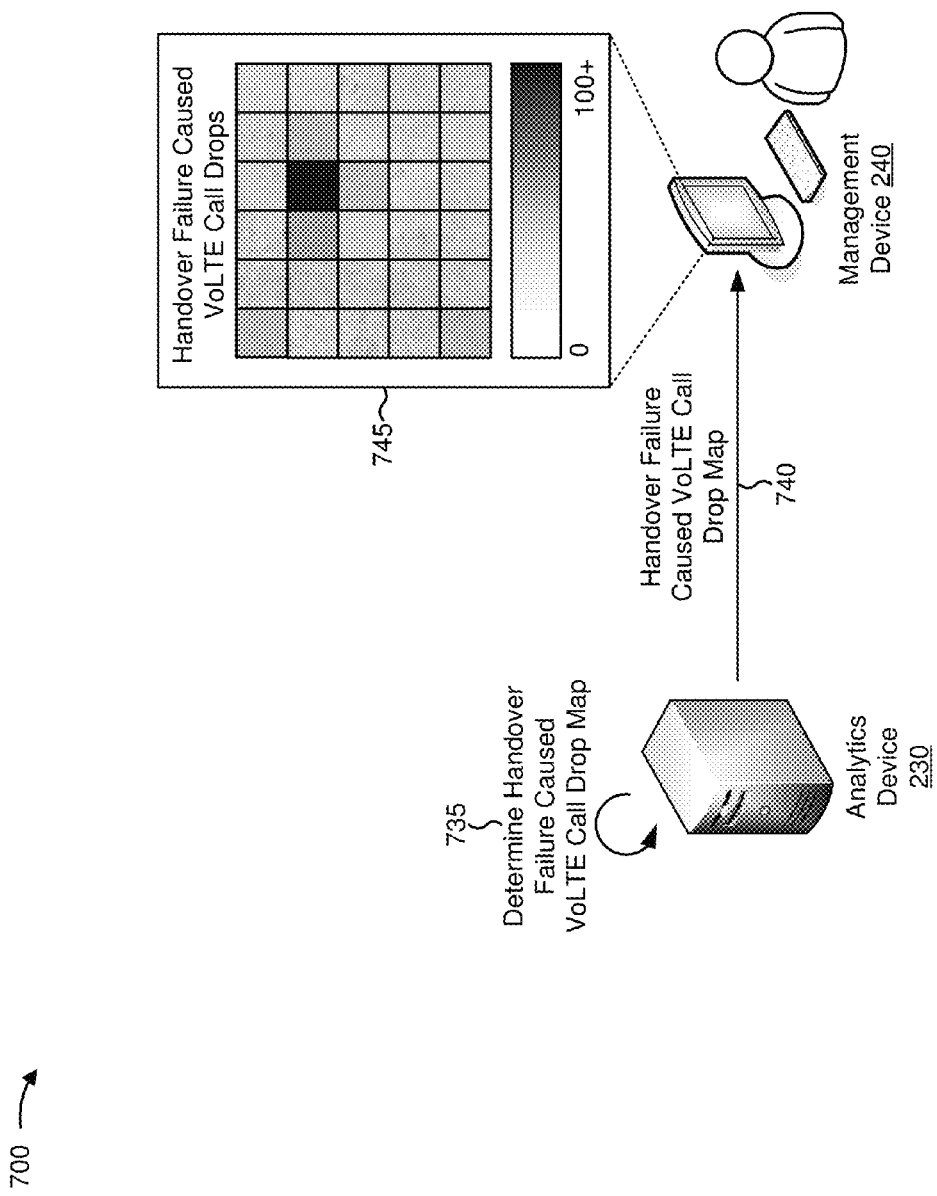

FIGS. 7A-7C are diagrams of an example implementation 700 relating to example process 600 shown in FIG. 6. For the purposes of example implementation 700, assume that analytics device 230 stores or has access to log information associated with user devices 210-1 through user devices 210-N.

As shown in FIG. 7A, and as shown by reference number 705, analytics device 230 may receive, from management device 240 (e.g., based on input from a user), an indication to generate action information associated with VoLTE call drops experienced by user device 210-1 through user device 210-N. As shown by reference number 710, analytics device 230 may receive the indication, and may determine (e.g., based on log information stored or accessible by analytics device 230) log information associated with user device 210-1 through user device 210-N.

As shown by reference number 715, analytics device 230 may analyze (e.g., using a pre-defined intelligence) the log information, associated with user device 210-1 through user device 210-N, to determine event information associated with VoLTE call drops experienced by user device 210-1 through user device 210-N, and may determine one or more root causes of the VoLTE call drops. For example, as shown, analytics device 230 may determine (e.g., based on a sequence of log information that identifies a known VoLTE call drop root cause pattern and/or signature, based on an indication included in the log information, etc.) whether each user device 210 has experienced a VoLTE call drop (e.g., that user device 210-1 has experienced a VoLTE call drop, that user device 210-N has not experienced a VoLTE call drop, etc.), in order to identify those user devices 210 that have experienced a VoLTE call drop. As further shown, analytics device 230 may also analyze the log information, associated with each user device 210 that has experienced a VoLTE call drop, to identify a cause of each VoLTE call drop (e.g., user device 210-1=Call Processing, user device 210-3=Handover Failure, etc.).

As shown in FIG. 7B, and as shown by reference number 720, analytics device 230 may determine, based on the event information associated with the VoLTE call drops and the causes of the VoLTE call drops, action information that identifies categories associated with the causes of the VoLTE call drops (e.g., information indicating that 30% of VoLTE call drops were caused by a handover failures, that 20% of the VoLTE call drops were caused by a call processing error, etc.). As shown by reference number 725, analytics device 230 may provide the action information to management device 240. As shown by reference number 730, management device 240 may provide the action information such that the action information may be viewed by a user.

For the purposes of FIG. 7C, assume that the user has viewed the action information, and that the user indicates (e.g., based on user input) that the user wishes to view additional action information in the form of a VoLTE call drop map associated with VoLTE call drops caused by handover failures. As shown by reference number 735, analytics device 230 may generate (e.g., based on location information included in the log information) a map that identifies locations at which user devices 210 experienced the VoLTE call drops caused by handover failures. For example, as shown, the map may identify (e.g., using shading, a color scale, numbers, etc.) a number of locations (e.g., cells, square miles, etc.), associated with handover failures overlaying a satellite image of a particular area. As shown by reference number 740, analytics device 230 may provide the handover failure caused VoLTE call drop map to management device 240. As shown by reference number 745, management device 240 may provide the handover failure caused VoLTE call drop map for display to the user. Here, the user may readily identify a coverage hole associated with the wireless network using the handover failure caused VoLTE call drop map (e.g., the coverage hole may exist where a high number of VoLTE call drops occurred due to handover failures).

In this manner, analytics device 230 may automatically analyze log information for many user devices 210 and may categorize causes of the VoLTE call drops. This may allow analytics device 230 to provide, to the user (e.g., a network operator associated with optimizing performance of the network), information that indicates where optimization efforts should be focused. For example, with regard to example implementation 700, analytics device 230 may provide event information and/or action information indicating that optimization efforts should be focused on reducing handover failures at one or more locations (e.g., since handover failures accounted for 30% of VoLTE call drops).

As indicated above, FIGS. 7A-7C are provided merely as an example. Other examples are possible and may differ from what was described with regard to FIGS. 7A-7C.

Implementations described herein may provide for wireless network analysis based on log information associated with user devices communicating via the wireless network. As such, the wireless network analysis may allow an event, associated with an event the user devices, to be automatically detected, identified, analyzed, categorized, classified, diagnosed, or the like, such that an operator of the wireless network may act accordingly.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

To the extent the aforementioned embodiments collect, store, or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "group" and "set" are intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:
1. A device, comprising:
  one or more processors to:
    determine log information collected by a user device,
      the log information including information associated with communications between the user device and a base station,
      the user device and the base station being associated with a wireless network, and
      the user device providing the log information based on occurrence of an event experienced by the user device during the communications between the user device and the base station;

analyze the log information to determine event information associated with the user device,
the event information including information associated with the event;
where the one or more processors, when analyzing the log information to determine the event information, are to:
determine that the user device has experienced the event during the communications with the base station based on a log information pattern that identifies at least one of a communication error event or a communication failure event, and
perform, based on determining that the user device has experienced the event, a root cause analysis to determine a sequence of log information that identifies a cause of at least one of the communication error event or the communication failure event;
generate action information for a plurality of user devices that have experienced the event based on the event information,
the action information including information indicating a plurality of causes, including the cause, of the at least one of the communication error event or the communication failure event; and
provide the action information.

2. The device of claim 1, where the one or more processors are further to:
receive an indication to generate the action information, the indication being based on user input; and
where the one or more processors, when generating the action information, are to:
generate the action information based on receiving the indication to generate the action information.

3. The device of claim 1, where the one or more processors, when analyzing the log information to determine the event information, are to:
identify the log information pattern; and
determine, based on the log information pattern, the event information indicating that the user device has experienced the event.

4. The device of claim 1, where the one or more processors are further to:
determine a category associated with the event experienced by the user device,
the category corresponding to a cause of the event; and
where the one or more processors, when generating the action information based on the event information, are to:
generate action information that identifies the category associated with the event.

5. The device of claim 1, where the action information is provided to permit a network operator, associated with the wireless network, to improve a performance of the wireless network based on the action information.

6. A computer-readable medium storing instructions, the instructions comprising:
one or more instructions that, when executed by one or more processors, cause the one or more processors to:
receive log information associated with a plurality of user devices,
the log information being collected by the plurality of user devices and being associated with communications between the plurality of user devices and a set of base stations,
the plurality of user devices and the set of base stations being associated with a wireless network, and
the plurality of user devices providing the log information based on occurrence of an event experienced by the plurality of user devices during the communications between the plurality of user devices and the set of base stations;
determine, based on the log information, event information associated with the plurality of user devices,
the event information including information associated with the event;
where the one or more instructions, that cause the one or more processors to determine the event information, cause the one or more processors to: determine that a user device, of the plurality of user devices, has experienced the event during the communications with a base station, of the set of base stations, based on a log information pattern that identifies at least one of a communication error event or a communication failure event, and
perform, based on the user device having experienced the event, a root cause analysis to determine a sequence of log information that identifies a cause of at least one of the communication error event or the communication failure event;
generate action information for a plurality of user devices that have experienced the event based on the event information,
the action information including information indicating a plurality of causes, including the cause, of the at least one of the communication error event or the communication failure event; and
provide the action information.

7. The computer-readable medium of claim 6, where the one or more instructions, when executed by the one or more processors, cause the one or more processors to:
receive an automatic indication to generate the action information; and
where the one or more instructions, that cause the one or more processors to generate the action information, cause the one or more processors to:
generate the action information based on receiving the automatic indication.

8. The computer-readable medium of claim 6, where the one or more instructions, that cause the one or more processors to determine the event information, cause the one or more processors to:
identify the log information pattern; and
determine, based on the log information pattern, the event information indicating that the plurality of user devices has experienced the event.

9. The computer-readable medium of claim 7, where the one or more instructions, that cause the one or more processors to determine the event information, cause the one or more processors to:
determine that the plurality of user devices has experienced the event during the communications with the set of base stations; and
determine, based on determining that the plurality of user devices has experienced the event, correlated sets of performance metrics associated with the event,
a set of performance metrics, of the correlated sets of performance metrics, corresponding to a user device of the plurality of user devices.

10. The computer-readable medium of claim 7, where the one or more instructions, when executed by the one or more processors, further cause the one or more processors to:
  determine an event map associated with the event experienced by the plurality of user devices,
    the event map identifying geographic locations associated with the event,
      a geographic location, of the geographic locations, corresponding to a user device of the plurality of user devices; and
  where the one or more instructions, that cause the one or more processors to generate the action information based on the event information, cause the one or more processors to:
    generate action information that includes the event map associated with the event.

11. The computer-readable medium of claim 7, where the log information includes at least one of:
  physical layer information associated with the plurality of user devices;
  media access control layer information associated with the plurality of user devices;
  radio link control layer information associated with the plurality of user devices;
  packet data convergence protocol layer information associated with the plurality of user devices; or
  radio resource control layer information associated with the plurality of user devices.

12. The computer-readable medium of claim 7, where the one or more instructions that, when executed by the one or more processors, further cause the one or more processors to:
  provide the action information to permit a network operator, associated with the wireless network, to enhance a performance of the wireless network based on the action information.

13. A method, comprising:
  determining, by a device, log information collected by at least one user device,
    the log information including information associated with communications between the at least one user device and at least one base station,
      the at least one user device and the at least one base station being associated with a wireless network, and
      the at least one user device providing the log information based on occurrence of an event experienced by the at least one user device during the communications between the at least one user device and the at least one base station;
  determining, by the device and based on the log information, event information associated with the at least one user device,
    the event information including information associated with the event;
  where determining the event information comprises:
    determining that a user device, of the at least one user device, has experienced the event during the communications with the at least one base station based on a log information pattern that identifies at least one of a communication error event or a communication failure event, and
    performing, based on determining that the user device has experienced the event, a root cause analysis to determine a sequence of log information that identifies a cause of at least one of the communication error event or the communication failure event;
  generating, by the device and based on the event information, action information for a plurality of user devices that have experienced the event based on the event information,
    the action information including information indicating a plurality of causes, including the cause, of the at least one of the communication error event or the communication failure event; and
  outputting or storing, by the device, the action information.

14. The method of claim 13, where determining the event information comprises:
  identifying the log information pattern associated with detecting or identifying that the at least one user device has experienced the event; and
  determining, based on the log information pattern, event information indicating that the at the at least one user device has experienced the event.

15. The method of claim 13, where determining the event information comprises:
  determining that the at least one user device has experienced the event during the communications with the at least one base station; and
  determining, based on determining that the at least one user device has experienced the event, at least one correlated set of performance metrics associated with the event.

16. The method of claim 13, further comprising:
  receiving an indication to generate the action information, the indication being based on user input; and
  generating the action information based on receiving the indication to generate the action information.

17. The method of claim 13, where the action information is provided to permit a network operator, associated with the wireless network, to improve a performance of the wireless network based on the action information.

18. The device of claim 1, where the event includes at least one of a call drop or a connection error.

19. The device of claim 1, where the sequence of log information identifies a software bug.

20. The method of claim 13, where the sequence of log information identifies a conformance activity associated with certification of the user device.

* * * * *